Jan. 28, 1936.  H. N. ATWOOD  2,029,049
BUILT-UP CELLULAR STRUCTURE AND METHOD OF MAKING THE SAME
Filed July 31, 1934

Inventor
Harry N. Atwood.
By Lacey & Lacey,
Attorneys.

Patented Jan. 28, 1936

2,029,049

UNITED STATES PATENT OFFICE 2,029,049

BUILT-UP CELLULAR STRUCTURE AND METHOD OF MAKING THE SAME

Harry N. Atwood, South Lyndeboro, N. H.

Application July 31, 1934, Serial No. 737,839

8 Claims. (Cl. 154—2)

This invention relates to a built up cellular structure and method of making the same.

The object of the invention is to provide a composite cellular structure, the component parts of which may be readily fabricated to form a built up structural unit which is light in weight and strong and durable in construction, and which may be used with good results as a beam or strut member in the construction of buildings or as a landing or take-off float for aircraft and for various other purposes.

A further object of the invention is to provide a structural unit including a plurality of laminated tubular members preferably impregnated with rubber and disposed in superposed layers with the tubular members of one layer arranged to break-joint with the tubular members of an adjacent layer, the tubular members of each layer being bonded together and to the tubular members of adjacent layers and the structure thus formed covered with cellulosic plastic material to provide a hard exterior surface or finish intimately combined with and bonded to said tubular members.

A still further object of the invention is generally to improve this class of structural units so as to increase their utility, durability and efficiency.

In the accompanying drawing forming a part of this specification and in which like numerals of reference indicate corresponding parts in all the figures of the drawing.

Figure 1:
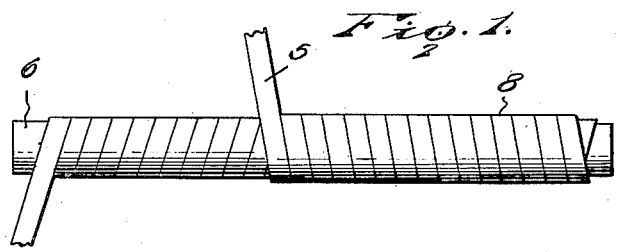
Figure 1 is a side elevation showing the manner of coiling or wrapping the wood veneer strips on a mandrel to form one of the tubular members.
Figure 2:
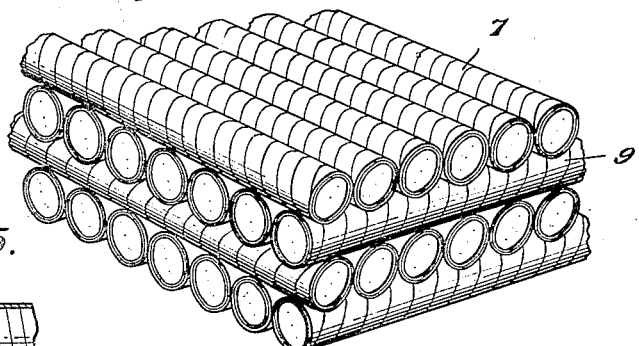
Figure 2 is a perspective view of a gang of said tubular members built up in superposed layers and before the outer protective coating or jacket is applied.

In accordance with the present invention, I take a thin strip 5 of natural wood veneer, preferably birch, and of any desired length, width and thickness, and preferably immerse this strip in a rubber or latex solution so as to thoroughly impregnate the fibers of the wood and cause said strip to present a sticky adhesive surface. The strip or strips are then dried and wound or coiled around a mandrel 6 of any desired cross sectional formation to form a tubular cylindrical member, indicated at 7. The strip or strips 5 are preferably wound in spiral superposed layers 8 with the adjacent edges of the veneer strips of the foundation layer abutting and with the next succeeding layer overlapping the foundation layer and in intimate contact therewith. Any desired number of layers of veneer may be employed according to the nature of the units desired and the strength and stability necessary for the particular use or purpose.

Inasmuch as the veneer strips are surfaced with rubber, when the strips are coiled around the mandrel, a tight adhesion between the strips will result and the body will be formed, in effect, of alternate layers of wood and rubber securely bonded together. After the tubular members are formed in this manner, they are disposed one above the other to form superposed layers 9 with the tubular members of each layer pressed in intimate contact with each other and with the tubular members of adjacent layers so as to be securely bonded thereto and in intimate contact therewith. Any number of layers of tubular members may be employed according to the desired thickness of the unit and the purpose for which it is intended, there being shown, by way of illustration in the present case, four layers so arranged that the tubular members of one layer will break-joint with the tubular members of the next succeeding layer.

After the tubular members are assembled in the manner described, the structure thus formed is immersed in an acetone solution containing approximately five percent, by weight, of solid cellulosic material, such as cellulose acetate, nitrate or cellulose ester, and allowed to remain therein until the cellulosic material entirely covers both the interior and the exterior of the tubular members so as to form a protective coating or jacket therefor. In some cases it may be found desirable to spray the cellulosic material directly on the tubular members instead of immersing said tubular members in the solution. During the immersion of the built up structure in the acetone solution, some of the solution will enter and coat the interior walls of the tubular members and also fill the gaps or spaces 10 between the several tubular members. Suitable mandrels are then inserted in the different tubular members so as to cause them to retain their shape during vulcanization, which latter is effected by placing the built up structure, with the mandrels in the tubular members, between suitable pressing elements which are heated to the proper temperature and then subjecting said elements to heat and pressure.

Figure 5:
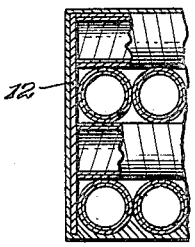
Figure 5 is a detail sectional view of one end of the unit showing a different manner of closing the tubular members.
Figure 3:
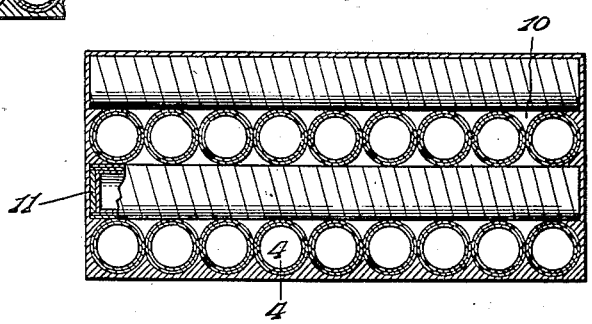
Figure 3 is a transverse sectional view of the finished built up structure or unit.
Figure 4:
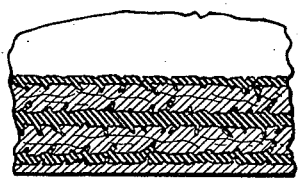
Figure 4 is an enlarged detail sectional view showing how the rubber solution and cellulosic material is forced into the fibers of the wood.

If desired suitable disks or other closure members 11 may be inserted in the open ends of the tubular members either prior or subsequent to immersing the unit in the cellulosic plastic material, and in some cases it may be found desirable to cover the open ends of the tubes, at each side of the unit, with a strip of rubberized veneer or other material 12, as best shown in Figure 5 of the drawing, and which rubberized strip will, of course, be covered with the cellulosic material.

The application of heat and pressure to the built up structure not only serves to vulcanize the rubber and causes it to penetrate the fibers of the wood, but also causes the plastic material to flow uniformly over the exterior of the structural unit and enter and cover any cracks or interstices which may not have been filled by the rubber. The plastic material also provides a smooth hard waterproof finish to the unit thereby enabling the unit to withstand the deleterious action of the elements for an indefinite period.

Inasmuch as the unit is of cellular construction, it is light in weight and will readily float so that the unit is especially adapted for use in the manufacture of landing or take-off floats or platforms for aircraft, although it may be used with equally good results as a beam or truss member in the construction of buildings and for various other purposes.

While it is preferred to impregnate the wood veneer strips with rubber, if desired, in certain cases and under certain conditions, the rubber may be omitted and the acetone solution applied directly to the wood veneer either before or after the strips are wound on the mandrel and I therefore do not desire to limit the invention in this respect.

It will, of course, be understood that the structural units may be made in different sizes and shapes and the individual tubular members of any desired cross sectional formation without departing from the spirit of the invention.

Having thus described the invention, I claim:

1. A composite structural unit comprising a plurality of tubular members each formed of superposed plies of wood veneer wound in spiral form with the wood veneer of adjacent plies overlapping, said tubular members being disposed in superposed layers to form a built-up structure with the tubular members of each layer having bonding engagement with each other and with the tubular members of adjacent layers, and an acetone solution containing cellulosic plastic material forming an exterior coating for the built up structure.

2. A composite structural unit comprising a plurality of tubular members disposed in superposed relation to form a built up structure, a coating of cellulosic plastic material covering the built up structure and intimately connected with and bonded thereto to form a hard exterior finish.

3. A composite structural unit comprising a plurality of rubber impregnated tubular members disposed in superposed layers with the tubular members of one layer arranged to break-joint with the tubular members of adjacent layers, and a coating of cellulosic plastic material forming a hard exterior finish for said unit and bonded to the adjacent rubber impregnated tubular members.

4. A composite structural unit comprising a plurality of tubular members each formed of laminations of wood veneer impregnated with rubber, said tubular members being disposed in superposed layers and arranged to break-joint with the tubular members of each layer having elastic bonding engagement with each other and with the tubular members of adjacent layers, and a coating of cellulosic plastic material entirely covering the unit.

5. A composite structural unit comprising a plurality of open-ended tubular members each formed of laminations of wood veneer disposed in spiral relation and impregnated with rubber, said tubular members being disposed in superposed layers and arranged to break-joint with the tubular members of each layer having elastic bonding engagement with each other and with the tubular members of adjacent layers, closures for the open ends of the tubular members, and a coating of cellulosic plastic material extending over the closures and bonded to the outermost layers of the tubular members to form a hard exterior finish therefor.

6. A composite structural unit comprising a plurality of open-ended tubular members each formed of laminations of wood veneer impregnated with rubber, said tubular members being disposed in superposed layers and arranged to break-joint with the tubular members of each layer having elastic bonding engagement with each other and with the tubular members of adjacent layers, a rubber impregnated reinforcing strip forming a closure for the open ends of the tubular members, and a coating of cellulosic plastic material covering said strip and the outermost layers of tubular members and filling the space between said tubular members to form a hard exterior finish.

7. The method of making a cellular structural unit which consists in winding a strip of fibrous material on a shaping mandrel to form a tubular member, removing the tubular member from the mandrel, assembling several of said tubular members in superposed layers to form a built up structure, applying an acetone solution containing a small percentage of cellulosic material to said built up structure, inserting finishing mandrels within the tubular members and while the finishing mandrels are in place subjecting the built up structure to heat and pressure.

8. The method of making a cellular structural unit which consists in impregnating a strip of wood veneer with rubber, winding the veneer strip on a shaping mandrel to form a tubular member, removing the tubular member from the mandrel, assembling several of said tubular members in superposed layers with the tubular members of one layer arranged to break-joint with the tubular members of an adjacent layer to form a united built up structure, immersing the built up structure in an acetone solution containing a small percentage of cellulosic material, inserting finishing mandrels within the tubular members, and while the finishing mandrels are in said tubular members subjecting the built up structure to heat and pressure to vulcanize the rubber and cause the cellulosic material to flow evenly over the surface of the built up structure to provide a hard exterior finish therefor.

HARRY N. ATWOOD.